(12) United States Patent
Paulus et al.

(10) Patent No.: US 8,534,893 B2
(45) Date of Patent: *Sep. 17, 2013

(54) FLAT PANEL LIGHT SOURCE FOR A TRANSILLUMINATION DEVICE OF A MICROSCOPE

(75) Inventors: Robert Paulus, Hergatz (DE); Reto Züst, Widnau (CH); Harald Schnitzler, Lüchingen (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,165

(22) Filed: Jan. 26, 2012

(65) Prior Publication Data

US 2012/0201046 A1    Aug. 9, 2012

(30) Foreign Application Priority Data

Feb. 3, 2011    (DE) .......................... 10 2011 003 568

(51) Int. Cl.
*F21V 5/00* (2006.01)
(52) U.S. Cl.
USPC ........... 362/575; 362/227; 362/572; 362/602; 362/613; 362/623; 359/385; 359/390
(58) Field of Classification Search
USPC ................. 362/227, 572, 575, 613, 615, 623, 362/624, 602; 359/385, 390
See application file for complete search history.

(56) References Cited

U.S. PATENT DOCUMENTS

| | | | |
|---|---|---|---|
| 5,249,077 A | 9/1993 | Laronga et al. | |
| 6,854,857 B2* | 2/2005 | Hara et al. | 362/613 |
| 7,345,815 B2 | 3/2008 | Shimizu et al. | |
| 7,554,727 B2 | 6/2009 | Shimizu et al. | |
| 2005/0225851 A1 | 10/2005 | Koerner et al. | |
| 2007/0242336 A1* | 10/2007 | Vodyanoy et al. | 359/234 |
| 2012/0201047 A1* | 8/2012 | Paulus et al. | 362/602 |

FOREIGN PATENT DOCUMENTS

| | | |
|---|---|---|
| CN | 101149525 | 3/2008 |
| DE | 102004017694 | 9/2005 |
| JP | 2000-48618 | 2/2000 |
| JP | 200375725 | 12/2003 |
| JP | 2005-266368 | 9/2005 |
| JP | U3136211 | 9/2007 |
| JP | 2008-21659 | 1/2008 |
| WO | 2009111494 | 9/2009 |

* cited by examiner

*Primary Examiner* — Stephen F Husar
*Assistant Examiner* — Meghan Dunwiddie
(74) *Attorney, Agent, or Firm* — Hodgson Russ LLP

(57) ABSTRACT

A flat panel light source (100) for a transillumination device of a microscope comprises a plate-shaped light guide (110) having a lower and an upper boundary surface, and at least one lateral surface (113 to 116), and having at least one light-emitting means (120, 122) arranged to radiate light into the light guide (110) from at least two different directions, via at least one lateral surface serving as a light entrance surface, such that the light propagates in the light guide (110) as a result of total reflection, the total reflection being disrupted in defined fashion, by an element (140) abutting against a contact surface at the lower boundary surface of the light guide (110), so that an outcoupling of light occurs on the upper boundary surface of the light guide (110), the planar area of the contact surface being smaller than the planar area of the lower boundary surface.

15 Claims, 3 Drawing Sheets

FLAT PANEL LIGHT SOURCE FOR A TRANSILLUMINATION DEVICE OF A MICROSCOPE

CROSS REFERENCE TO RELATED APPLICATIONS

This application claims priority of German patent application number 10 2011 003 568.0 filed Feb. 3, 2011, the entire disclosure of which is incorporated by reference herein.

FIELD OF THE INVENTION

The present invention relates to a flat panel light source for a transillumination device of a microscope, in particular for those having a continuously modifiable magnification, called "zoom microscopes" for short, in particular stereomicroscopes or macroscopes.

BACKGROUND OF THE INVENTION

Flat panel light sources for a transillumination device of a microscope are known from the existing art, for example from DE 10 2004 017 694 B3 or U.S. Pat. No. 7,554,727 B2. They are arranged below the specimen plane. The distance between the flat panel light source and specimen is selected to be large enough that the specimen is completely illuminated, and the structure of the light-emitting means is no longer visible in the specimen plane. In the existing art, however, the overall height of the transillumination base is too high. Ergonomic considerations are not taken into account. In order to allow implementation of a flat transillumination device for microscopes, for example stereomicroscopes and macroscopes, a desire exists to configure the core element—the light source—to be as flat as possible but to radiate light homogeneously. DE 10 2004 017 694 B3, for example, teaches the use of a diffusion disk over the light source for homogenization, although this has a negative effect on overall height and on the efficiency of the light-emitting means.

It is therefore desirable to describe a maximally flat but nevertheless homogeneous transillumination device for a microscope.

SUMMARY OF THE INVENTION

According to the present invention, a flat panel light source for a transillumination device of a microscope is presented.

The invention is notable for the fact that light propagating in a plate-shaped light guide as a result of total reflection is outcoupled by deliberate disruption of the total reflection. The disruption occurs at a lower boundary surface ("lower side") of the light guide by way of an element abutting against a so-called "contact surface." As a consequence, light is outcoupled at an upper boundary surface ("upper side"). The element is optically coupled to the light guide and is embodied so that diffuse scattering is produced, so that outcoupling of light at the upper side occurs.

The contact surface contacted by the element acts as a radiating surface. The use of a light guide that, for outcoupling, is equipped only with one contact surface not only makes it possible to obtain a particularly flat conformation, but also results in an initial homogenization of the radiated light because of the intermixing of light inside the light guide.

A further homogenization is achieved by the fact that light is coupled into the light guide from at least two different directions. In the case of a light guide shaped like a prism or a truncated pyramid, for example, i.e. a light guide having a polygonal base surface, incoupling occurs at at least two of the lateral surfaces. In the case of a cylindrical or frustoconical light guide, i.e. a light guide having an elliptical base surface, incoupling occurs at at least two locations on the enveloping surface that are preferably distributed evenly over the circumference. Incoupling from the side moreover allows a low overall height.

A further improvement in homogenization is achieved by the fact that the planar area of the contact surface is smaller than the planar area of the lower side. An edge region that serves not for radiation, but instead exclusively for homogenization, therefore remains. The light guide can therefore be selected to be as large as seems necessary for reasons of homogeneity, while the size of the contact surface (which defines the radiating surface) can be selected independently thereof With the invention it is possible to create a flat panel light source for a transillumination device of a microscope that radiates light particularly homogeneously. The flat panel light source is very flat in conformation and moreover is easy to manufacture and to handle. Manufacture is economical because expensive optics, and expensive alignment, are not necessary.

The configuration according to the present invention causes heat generation to be separated from the location where the light emission is used. This separation enables largely temperature-neutral illumination of the sample. This arrangement proves advantageous specifically for implementation of a large-area light source, since the necessary light output of the light-emitting means increases as the square of the diameter of the emitting surface. Positioning of the radiating surface below the sample therefore does not necessarily result in heating of the sample, since the heat-generating light-emitting means are arranged laterally, remotely from the sample. With the arrangement according to the present invention, the heat that is produced can be better dissipated.

Advantageous embodiments are the subject matter of the dependent claims and of the description that follows.

The light guide is flat, so that its height is less than its lateral extension, in particular at least ten times less. As a result, the necessary overall height is kept low, and the object plane, which is located above the flat panel light source, does not migrate too far upward.

The element that disrupts total reflection preferably is reversibly deformable. As a result, the planar area of the contact surface can be reversibly modified by a user so that the size of the contact surface, and thus of the radiating surface, can be defined and adjusted particularly easily. The illumination device can thus be adapted to that portion of the sample which is to be observed.

Particularly homogeneous radiating characteristics are achieved if the element that disrupts total reflection produces a diffuse scattering of the light propagating in the light guide. The radiation thereby produced substantially obeys Lambert's law, so that the radiation density is substantially constant in all directions. An ideally diffusely scattering surface (according to Lambert's law) re-emits the irradiated power level in distributed Lambert fashion regardless of illumination direction, i.e. it appears equally bright regardless of the viewing angle (constant luminance). The element that disrupts total reflection preferably has a reflectance factor adapted to the at least one light-emitting means.

The element that disrupts total reflection preferably has a reflectance factor R of between 0.3 and 0.7. This is particularly suitable for not generating dazzle effects for the user when the light-emitting means are relatively strong. On the other hand, a reflectance factor R of between 0.7 and 1, in particular more than 0.7 or more than 0.9, is also particularly preferred for weaker light-emitting means. These weaker light-emitting means may exhibit a heat evolution that is advantageous because it is low. This allows a shorter distance between the light-emitting means and the radiating surface, and thus a compact conformation for the flat panel light source as a whole.

The element that disrupts total reflection is preferably a lining applied onto the lower boundary surface, in particular in the form of an applied coating or film. The lining can be bonded on, painted on, spread on, or the like. The lining is preferably embodied in the form of a paste that is to be applied. The paste usefully is light in color, e.g. white or beige, and usefully contains a large number of reflecting and/or scattering centers, for example embedded molecules.

The at least one light-emitting means usefully encompasses an LED or a cold-cathode tube. The configuration of the light-emitting means has a particular influence in terms of optimizing the light output transported in the light guide. The radiating angle of the light-emitting means is preferably adapted to the geometry of the light guide, efficiency being influenced the height of the light guide, and by the distance between the light-emitting element (e.g. chip) in the light-emitting means and the light entrance surface.

An adaptation of the spacing of the light-emitting elements from one another helps to optimize homogeneity and to minimize the dimension of the light guide. A superposition of the incoupled light of adjacent sources takes place only starting at a certain distance from the edge of the light guide, which in turn depends on the aforesaid spacing of the light sources. The planar area of the contact surface is therefore, according to the present invention, smaller than the planar area of the lower side, so that intermixing is achieved.

In a particularly preferred configuration, the plate-shaped light guide is embodied as a prism or as a truncated pyramid, i.e. the base surface defining the upper and the lower side is a polygon. With this type of configuration, two or more lateral surfaces can each be particularly easily equipped with a light-emitting means. The manufacture and handling of such a shape are moreover not associated with any difficulties. It is furthermore particularly easy to provide cooling devices (heat sinks, etc.) on the flat lateral surfaces in order to cool the light-emitting means.

In a configuration that is also preferred, the plate-shaped light guide is embodied as a cylinder or a truncated cone, i.e. the base surface defining the upper side and lower side is an ellipse (including a circle). With this type of configuration, particularly good homogenization can be achieved if one or more light-emitting means are arranged on the circumference of the cylinder in such a way that "all-around" irradiation occurs.

The geometry and orientation, relative to the main beam proceeding from the light-emitting means, of the lateral surfaces of the light guide that serve as light entrance surfaces can be used as a parameter for controlling the distribution of the light in the light guide and thereby for influencing the homogeneity of the light radiated from the flat panel light source. A tilting of the lateral surface serving as an entrance surface is mentioned here, for example. This modification of the entrance surface contributes to optimization of the overall height of the flat panel light source, since with this action, regions of the element that disrupts total reflection that are located closer to the optical axis of the microscope experience better illumination coverage.

At least one entrance surface is preferably frosted. This homogenizes the light distribution over the solid angle in the light guide. Larger angles in the light guide are thereby more heavily weighted, and the light intensity is manipulated in favor of the edge zones of the element that disrupts total reflection.

It is a matter of course to deliberately define the optical refractive index of the element that disrupts total reflection. The light of the light-emitting means is coupled laterally into the light guide and transported by total reflection in the light guide until it is outcoupled upward out of the plate by means of a controlled disruption of total reflection (element that disrupts total reflection). Upon entering from air into the light guide having a refractive index n1, light is refracted toward the axis. It is then either totally reflected or outcoupled at the outer sides. The equation governing the acceptance angle a, which describes the maximum angle at which light can be incident onto the light guide so that it is still guided, is:

$$\sin^2(\alpha) = n1^2 - n2^2,$$

in which it is assumed that incoupling into the light guide occurs through air (n=1). n2 is a possible refractive index of an adjacent medium. For the case in which the adjacent medium is air (n2=1), the acceptance angle a encompasses the entire half-space as soon as the refractive index of the plate is selected as $n1 > \sqrt{2} \approx 1.41$. Predefinition of the refractive index of the element that disrupts total reflection as n2 >1 causes outcoupling of that portion of the angular region for which the condition $\sin^2(\alpha) \geq n1^2 - n2^2$ is met. In a preferred embodiment, $n2 \geq n1$, so that all the light is outcoupled and scattered. This serves to increase the luminance.

A diaphragm for defining a radiating surface is usefully provided on the upper side. If the diaphragm is additionally mirror-coated on the side facing toward the upper boundary surface, that light component is not lost.

Further advantages and embodiments of the invention are evident from the description and the appended drawings.

It is understood that the features recited above and those yet to be explained below can be used not only in the respective combination indicated, but also in other combinations or in isolation, without leaving the context of the present invention.

DESCRIPTION OF THE FIGURES

The invention is schematically depicted in the drawings on the basis of an exemplifying embodiment, and will be described in detail below with reference to the drawings.

FIG. 1b is a cross-sectional view of the flat panel light source in accordance with FIG. 1a.

DETAILED DESCRIPTION OF THE INVENTION

Figure 1A:
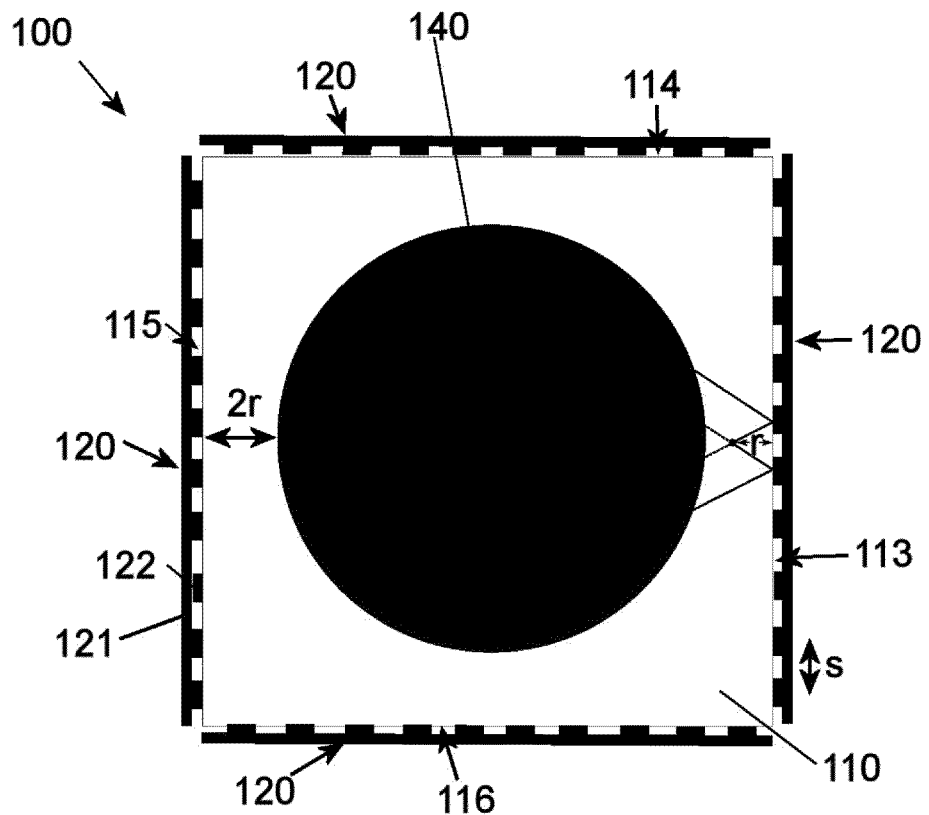
FIG. 1a is a plan view of a first preferred embodiment of a flat panel light source according to the present invention.

In FIGS. 1 to 3, identical elements are labeled with identical reference characters.

Figure 1B:
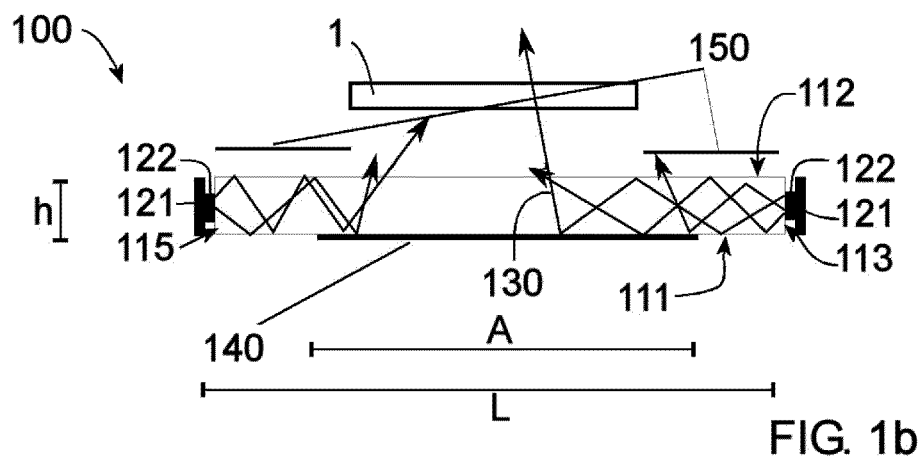

FIGS. 1a and 1b, which depict a first preferred embodiment of a flat panel light source respectively in a plan view and a cross-sectional view, will be described below in continuous and overlapping fashion.

In FIG. 1, a first preferred embodiment of a flat panel light source according to the present invention for a transillumination device of a microscope is depicted schematically in a plan view and labeled in its entirety with the number 100.

Flat panel light source 100 comprises a plate-shaped light guide 110. The plate-shaped light guide is made, for example, of acrylic, glass, or the like and here has the shape of a prism, specifically a cuboid. Plate-shaped light guide 110 encompasses a lower (in this case, square) boundary surface 111 and a congruent upper boundary surface 112. Light guide 110 has a lateral extension L and a height h, such that preferably h<0.1 L.

Light guide 110 furthermore comprises four side surfaces 113 to 116. In the present example, light-emitting means 120 are coupled onto all side surfaces 113 to 116. Light-emitting means 120 encompass a carrier 121, serving simultaneously as a heat sink, on which are arranged a number of light-emitting elements embodied here as light-emitting diodes 122. Light-emitting diodes 122 are arranged on light guide 110 in such a way that light 130 radiated from light-emitting diodes 122 propagates in the light guide as a result of total reflection. Light-emitting diodes 122 are at a center-to-center distance s from one another.

Abutting against lower boundary surface 111 is an element 140 that disrupts total reflection and is embodied in the present example in circular fashion. Be it noted that a rectangular configuration is also preferred. The abutting region is referred to as a "contact surface" and has a planar area A that is smaller than planar area $L^2$ of lower boundary surface 111. In particular, the contact surface is at a distance $2r$ from the lateral surfaces serving as entrance surfaces, which distance is preferably determined as follows:

In the light guide, the incoupled light is refracted by the refractive index n toward the vertical. A superposition of the incoupled light of adjacent light-emitting diodes thus takes place only starting at a distance $r=s/2*\sqrt{(n^2-1)}$ from the edge of the light guide. It is therefore advantageous to provide a total-reflection region at the edge of the plate so that good intermixing is achieved. Because of the non-isotropic angular characteristic of the light-emitting means, a width of at least $2r$ is typically provided for the edge zone.

The cuboidal shape of light guide 110 makes possible particularly simple handling and attachment of light-emitting means 120, since lateral surfaces 113 to 116 are flat.

In the present example, irradiation of light 130 occurs at all four lateral surfaces 113 to 116, so that for purposes of the invention an irradiation of light occurs from four different directions. Although in a technical sense each of the individual light-emitting diodes 122 radiates in infinitely many directions, "irradiation from different directions" is to be understood for purposes of the invention to mean that the principal radiating directions of the light-emitting means are different.

Element 140 that disrupts total reflection is usefully embodied as a paste applied onto lower boundary surface 111. A bonded-on film is likewise a possibility. Element 140 usefully is substantially opaque, so that the majority of the incident light is not transmitted but instead is scattered and is not lost. The reflectance factor is preferably above 0.9. Element 140 is light in color, e.g. white or beige, and acts as a diffuse scattering surface. The result is that light 130 incident onto element 140 is diffusely reflected or scattered upward, such that a portion leaves light guide 110 at upper boundary surface 112 and can be used for transillumination of a sample 1 arranged thereabove.

A diaphragm, configured here as an aperture 150, is provided above upper boundary surface 112. The side of diaphragm 150 facing toward upper boundary surface 112 is mirror-coated.

Figure 2A:
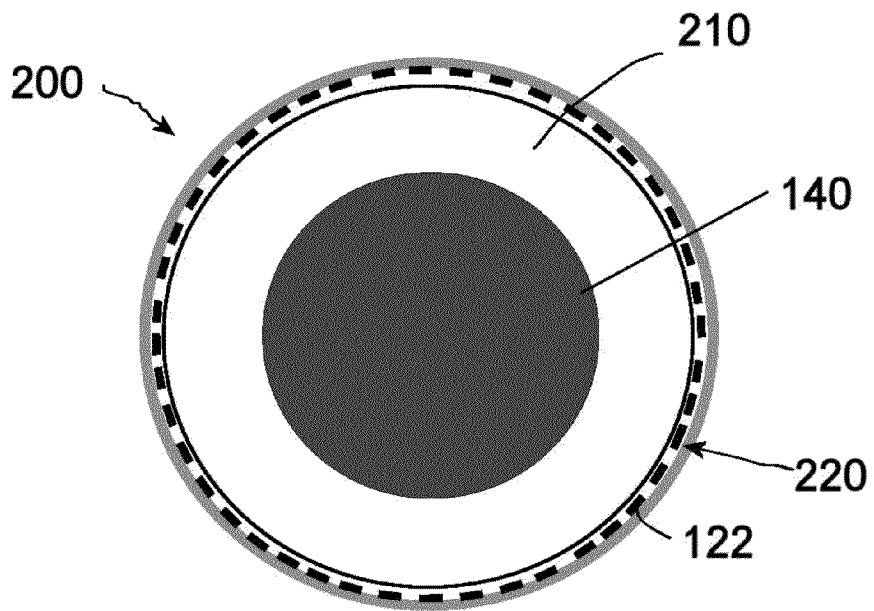
FIGS. 2a and 2b are plan views of further preferred embodiments of flat panel light sources according to the present invention.

In FIG. 2a, a second preferred embodiment of a flat panel light source according to the present invention is depicted in a plan view and labeled with the number 200. Flat panel light source 200 comprises a cylindrical light guide 210 that is surrounded by a number of light-emitting means 220 comprising light-emitting diodes 122. Element 140 is likewise applied on the lower side of the cylindrical light guide 210.

The cylindrical shape of light guide 210, and the irradiation of light from all directions associated therewith, result in particularly good homogenization of the radiated light.

Figure 2B:
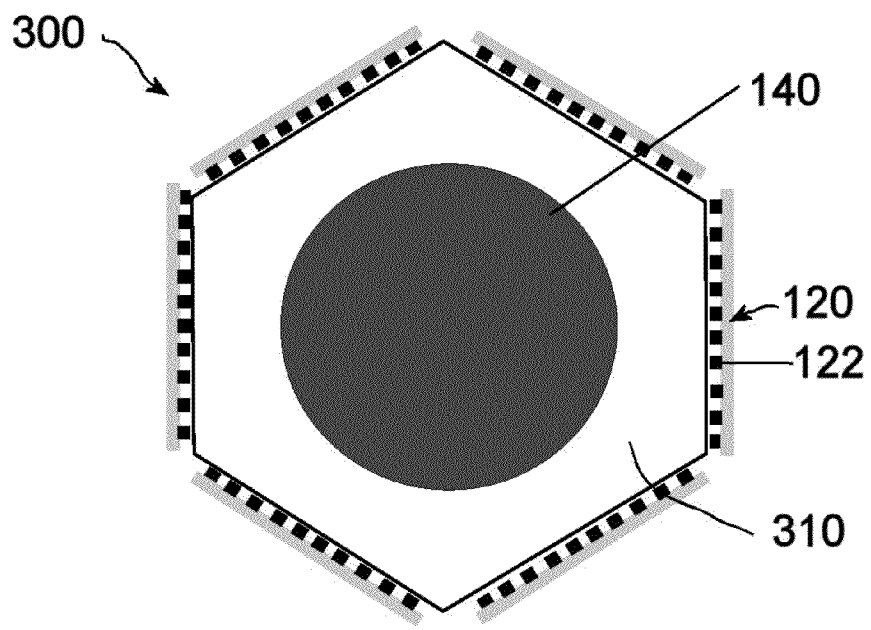

In FIG. 2b, a third preferred embodiment of a flat panel light source according to the present invention is depicted in a plan view and labeled with the number 300. Flat panel light source 300 once again encompasses a prism-shaped light guide 310 whose base surface is in the shape of a regular hexagon. In the present example, all six lateral surfaces of light guide 310 are equipped with light-emitting means 120 so that irradiation of light occurs from six directions. This embodiment offers on the one hand particularly good homogenization due to irradiation from many directions, and on the other hand flat lateral surfaces that allow the light-emitting means, and also mounts, heat sinks, etc., to be attached easily.

Figure 3A:
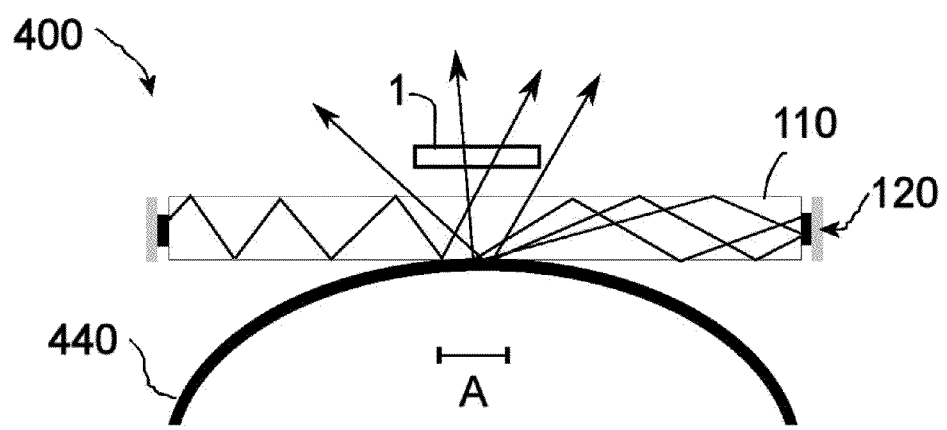
FIG. 3a is a cross-sectional view of a further preferred embodiment of a flat panel light source according to the present invention in which the element that disrupts total reflection assumes a first shape.
Figure 3B:
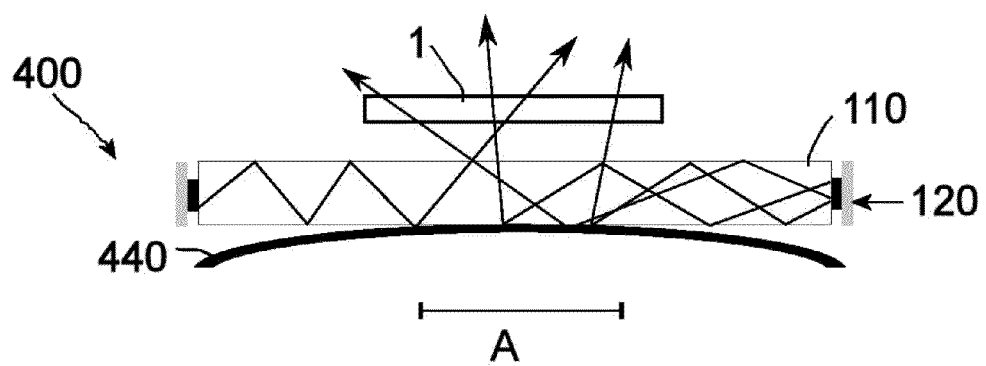
FIG. 3b shows the embodiment according to FIG. 3a, the element that disrupts total reflection assuming a second shape.

FIGS. 3a and 3b depict a fourth preferred embodiment of a flat panel light source 400 according to the present invention in a cross-sectional view. In contrast to flat panel light source 100 according to FIG. 1, flat panel light source 400 comprises an elastically deformable element 440 to disrupt total reflection. Element 440 can be made, for example, of elastic plastic, such that the size of contact surface A can be modified by deformation of element 440. The element can be embodied, for example, in balloon-like fashion, deformation being possible by inflation and deflation. The element can also, for example, be embodied resiliently, so that a deformation occurs as a result of applied pressure (see FIG. 3b) and release (see FIG. 3a). The size of contact surface A, and thus the size of the radiating surface, can be adjusted in this fashion to the size of sample 1 that is to be transilluminated.

What is claimed is:

1. A flat panel light source (100; 200; 300; 400) for a transillumination device of a microscope, for viewing a sample (1) in the microscope, the flat panel light source (100; 200; 300; 400) comprising:
    a plate-shaped light guide (110; 210; 310) having a lower boundary surface (111), an upper boundary surface (112), and at least one lateral surface (113 to 116);
    at least one light-emitting means (120, 122) arranged to radiate light (130) into the light guide (110; 210; 310) from at least two different directions, via at least one lateral surface of the light guide serving as a light entrance surface, wherein the light propagates in the light guide (110; 210; 310) as a result of total reflection; and
    an element (140; 440) abutting against a contact surface at the lower boundary surface (111) of the light guide, wherein the element disrupts the total reflection such that an outcoupling of light occurs through the upper boundary surface (112) of the light guide (110; 210; 310);
    wherein a planar area of the contact surface is less than a planar area of the lower boundary surface (111).

2. The flat panel light source (100; 200; 300; 400) according to claim 1, wherein the element (140; 440) that disrupts total reflection produces a diffuse scattering, at the contact surface, of the light (130) propagating in the light guide (110; 210; 310).

3. The flat panel light source (100; 200; 300; 400) according to claim 1, wherein the element (140; 440) that disrupts total reflection is opaque and has a reflectance factor R over the visible spectral region of $0.3 \leq R \leq 0.7$ or $R \geq 0.7$ or $R \geq 0.9$.

4. The flat panel light source (100; 200; 300; 400) according to claim 1, wherein the element that disrupts total reflection is a lining applied onto the lower boundary surface (111).

5. The flat panel light source (100; 200; 300; 400) according to claim 1, wherein the element that disrupts total reflection is a paste applied onto the lower boundary surface (111).

6. The flat panel light source (100; 200; 300; 400) according to claim 1, wherein the element that disrupts total reflection is a film adhering onto the lower boundary surface (111).

7. The flat panel light source (100; 200; 300; 400) according to claim 1, wherein the element that disrupts total reflection is reversibly deformable for varying the planar area of the contact surface.

8. The flat panel light source (100; 200; 300; 400) according to claim 1, wherein the optical refractive index of the element (140; 440) that disrupts total reflection is equal to or greater than the optical refractive index of the light guide (110; 210; 310).

9. The flat panel light source (100; 200; 300; 400) according to claim 1, wherein the at least one light-emitting means (120) comprises an LED (122) or a cold-cathode tube.

10. The flat panel light source (100; 200; 300; 400) according to claim 1, wherein at least one lateral surface of the light guide that serves as a light entrance surface encloses, with the lower boundary surface (111) and/or with the upper boundary surface (112), an angle that is less than or greater than 90°.

11. The flat panel light source (100; 200; 300; 400) according to claim 10, wherein the angle is less than 85° or greater than 95°.

12. The flat panel light source (100; 200; 300; 400) according to claim 1, wherein at least one lateral surface of the light guide that serves as a light entrance surface is at least partly frosted.

13. The flat panel light source (100; 200; 300; 400) according to claim 1, wherein the plate-shaped light guide has the shape of a prism (110; 310), a truncated pyramid, a cylinder (210), or a truncated cone.

14. The flat panel light source (100; 200; 300; 400) according to claim 1, further comprising a diaphragm (150) provided above the upper boundary surface (112) for delimiting the light-emitting surface.

15. The flat panel light source (100; 200; 300; 400) according to claim 14, wherein the diaphragm (150) is minor-coated on a side thereof facing toward the upper boundary surface (112).

\* \* \* \* \*